No. 711,401. Patented Oct. 14, 1902.
O. R. JOHNSON.
SAW SET.
(Application filed Apr. 15, 1902.)
(No Model.)
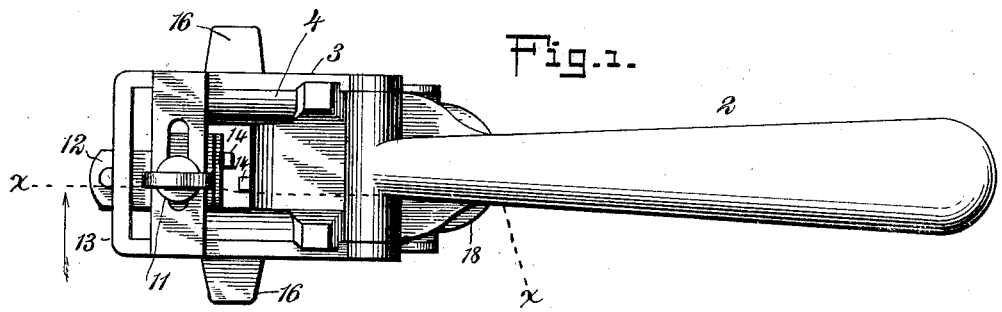
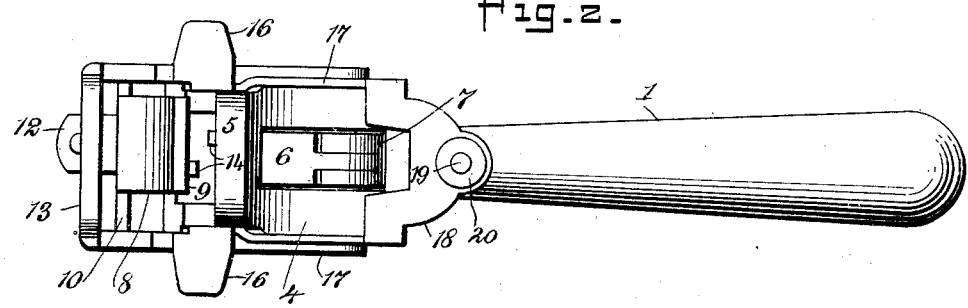
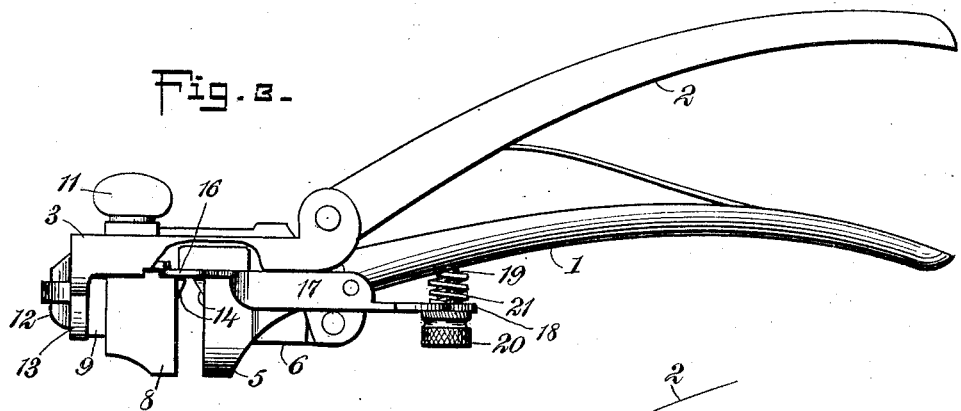
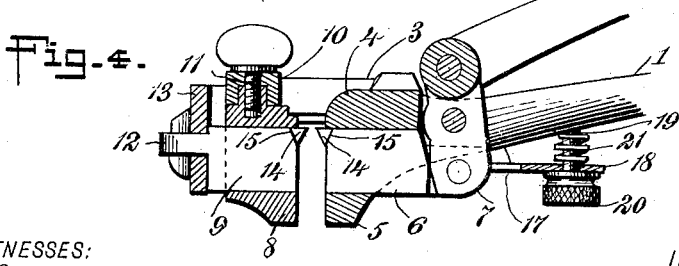
WITNESSES:
Charles F. Wilcox.
C. R. Ferguson
INVENTOR
Olof R. Johnson
BY
ATTORNEYS.

UNITED STATES PATENT OFFICE.

OLOF R. JOHNSON, OF ESCANABA, MICHIGAN.

SAW-SET.

SPECIFICATION forming part of Letters Patent No. 711,401, dated October 14, 1902.

Application filed April 15, 1902. Serial No. 102,961. (No model.)

*To all whom it may concern:*

Be it known that I, OLOF R. JOHNSON, a citizen of the United States, and a resident of Escanaba, in the county of Delta and State of Michigan, have invented a new and Improved Saw-Set, of which the following is a full, clear, and exact description.

This invention relates to improvements in saw-sets, the object being to provide a convenient hand-tool by means of which in one operation two teeth may be set in opposite directions, thus reducing the length of time required for setting the saw and assuring a uniform set.

A further object is to so construct the device that it can be quickly adjusted to saws of different sizes.

I will describe a saw-set embodying my invention and then point out the novel features in the appended claim.

Reference is to be had to the accompanying drawings, forming a part of this specification, in which similar characters of reference indicate corresponding parts in all the figures.

Figure 1 is a top plan view of a saw-set embodying my invention. Fig. 2 is a bottom plan view thereof. Fig. 3 is a side view, and Fig. 4 is a section on the line $x\ x$ of Fig. 1.

The saw-set comprises what may be termed a "fixed" handle 1 and a "movable" handle or lever 2. The handle 2 has pivotal connection with a yoke 3, movable on a frame 4, extended from the fixed handle 1. Extended downward from the forward end of the handle 1 is a guide 5, having an opening in which a setting-block 6 is movable. The rear end of this block 6 has pivotal connection with a link 7, the said link being fulcrumed on the handle 1 and connected at its upper end to the handle 2. On the forward end of the frame 4 is a guide 8, in an opening in which is movable the setting-block 9. This guide 8 is adjustable transverely, and, as here shown, its upper portion is reduced and engaged in a channel formed in the end bar 10 of the frame 4. This bar 10 is provided with a slot, through which a set-screw 11 passes. The block 9 has a shank portion 12 extended through a slot in the end bar 13 of the yoke 3.

The blocks 6 and 9 are each provided with a setting-tooth 14, and at the sides of the setting-teeth the blocks have upwardly and outwardly inclined surfaces, as indicated at 15.

In operation the block 9 may be adjusted relatively to the block 6 to bring the teeth 14 toward or from each other, depending upon the size of the saw-teeth to be set. The saw is to be placed between the guides 5 and 8, with the teeth 14 engaging with the saw-teeth, and obviously by a movement of the handle 2 toward the handle 1 the blocks 6 and 9 will be moved toward each other, causing the teeth of the saw to be set or bent in opposite directions.

To adjust the device for different lengths of teeth, I provide guide-fingers 16, which are connected to arms 17, pivoted to the handle 1. At the rear ends these arms 17 are connected by a cross-plate 18, which is provided with an opening, through which a screw-bolt 19 passes, the said screw-bolt being connected to the handle 1, and at its outer end it is engaged by a thumb-nut 20. By moving the thumb-nut 20 outward on the screw 19 the fingers 16 will be moved toward the yoke 3 by means of a spring 21, which surrounds the screw-bolt, thus providing for setting saws with long teeth. Obviously by screwing the nut 20 inward the fingers 16 will be moved outward, so as to limit the inward movement of a short-toothed saw.

It is obvious that as the blocks 6 and 9 are beveled the teeth of the saw will be forced by the tooth 14 of one block into the inclined portion 15 of the other block, and therefore the set of all the teeth of the saw will be uniform.

Having thus described my invention, I claim as new and desire to secure by Letters Patent—

In a saw-set, the combination of a fixed handle, a pivoted handle, a setting-block movable in a guide rigidly connected to the fixed handle, a connection between the pivoted handle and the block, a frame extended from the fixed handle and having a slotted cross-bar at its end, a yoke extended from the movable handle and having a slotted end bar, a guide movable transversely in said frame, a set-screw passing through the slot of the frame cross-bar and engaging with the guide, and a setting-block movable in said guide and having a shank extended through the slot of the yoke end bar.

In testimony whereof I have signed my name to this specification in the presence of two subscribing witnesses.

OLOF R. JOHNSON.

Witnesses:
JULIAN EDAIN,
ALFRED P. SMITH.